US010427168B2

(12) United States Patent
Loreth (10) Patent No.: US 10,427,168 B2
(45) Date of Patent: Oct. 1, 2019

(54) PRECIPITATOR UNIT

(71) Applicant: Eurus AirTech AB, Åkersberga (SE)

(72) Inventor: Andrzej Loreth, Åkersberga (SE)

(73) Assignee: Eurus AirTech AB, Åkersberga (SE)

( * ) Notice: Subject to any disclaimer, the term of this patent is extended or adjusted under 35 U.S.C. 154(b) by 356 days.

(21) Appl. No.: 15/521,136

(22) PCT Filed: Oct. 21, 2015

(86) PCT No.: PCT/SE2015/051118
§ 371 (c)(1),
(2) Date: Apr. 21, 2017

(87) PCT Pub. No.: WO2016/064335
PCT Pub. Date: Apr. 28, 2016

(65) Prior Publication Data
US 2017/0354976 A1    Dec. 14, 2017

(30) Foreign Application Priority Data

Oct. 23, 2014  (SE) ...................................... 1451270

(51) Int. Cl.
*B03C 3/02* (2006.01)
*B03C 3/16* (2006.01)
(Continued)

(52) U.S. Cl.
CPC ................ *B03C 3/025* (2013.01); *B03C 3/06* (2013.01); *B03C 3/09* (2013.01); *B03C 3/12* (2013.01);
(Continued)

(58) Field of Classification Search
CPC combination set(s) only.
See application file for complete search history.

(56) References Cited

U.S. PATENT DOCUMENTS 2,650,672 A * 9/1953 Barr .......................... B03C 3/72
315/200 R
2,926,749 A * 3/1960 Oswald ..................... B03C 3/49
55/DIG. 38
(Continued)

FOREIGN PATENT DOCUMENTS

DE          2727973 A1     1/1978
JP          1190265 A      4/1999
(Continued)

*Primary Examiner* — Amber R Orlando
*Assistant Examiner* — Sonji Turner
(74) *Attorney, Agent, or Firm* — Blank Rome LLP (57) ABSTRACT

Precipitator unit of a two-stage electro filter where air to be cleaned from electrically charged particles is intended to flow through the unit. Said unit comprising at least two cylindrical precipitators (10, 11) that each comprise at least two electrode elements arranged at a gap distance from each other. Each one of the precipitators (10, 11) is also intended to be connected to a high voltage source. The respective electrode elements of a precipitator (10, 11) are connected to different poles of the high voltage source. The main planes of the precipitators (10, 11) are axially spaced in the air flow direction and a cone shaped duct (21) extends between the circumference of the first precipitator (10) and a center opening (13) of the second precipitator (11). A first amount of polluted air flows across the area of the first precipitator (10) and continues afterwards through the inside of the cone shaped duct (21) and out of the unit through the center opening (13) of the second precipitator (11). A second amount of polluted air flows outside the circumference of both the first precipitator (10) and the cone shaped duct (21) in order to be cleaned by the second precipitator (11).

10 Claims, 7 Drawing Sheets

(51) Int. Cl.
  *B03C 3/06* (2006.01)
  *B03C 3/49* (2006.01)
  *B03C 3/82* (2006.01)
  *F24F 3/16* (2006.01)
  *B03C 3/09* (2006.01)
  *B03C 3/12* (2006.01)
  *B03C 3/47* (2006.01)

(52) U.S. Cl.
  CPC .................. *B03C 3/47* (2013.01); *B03C 3/49* (2013.01); *B03C 3/82* (2013.01); *F24F 3/166* (2013.01); *F24F 2003/1682* (2013.01)

(56) References Cited

U.S. PATENT DOCUMENTS

| | | | | | |
|---|---|---|---|---|---|
| 2,970,670 | A | * | 2/1961 | Nodolf | B03C 3/12 96/79 |
| 3,447,049 | A | * | 5/1969 | Morfopoulos | B03C 5/026 361/226 |
| 3,722,183 | A | * | 3/1973 | Gaylord | B03C 3/06 55/DIG. 38 |
| 4,313,741 | A | * | 2/1982 | Masuda | B03C 3/12 96/78 |
| 4,812,711 | A | * | 3/1989 | Torok | H01T 23/00 261/DIG. 42 |
| 4,967,119 | A | * | 10/1990 | Torok | H01T 19/00 261/DIG. 42 |
| 5,012,159 | A | * | 4/1991 | Torok | B03C 3/38 250/324 |
| 5,077,500 | A | * | 12/1991 | Torok | H01T 23/00 250/324 |
| 5,180,404 | A | * | 1/1993 | Loreth | C01B 13/11 315/111.91 |
| 5,198,003 | A | * | 3/1993 | Haynes | B03C 3/08 264/259 |
| 6,203,600 | B1 | * | 3/2001 | Loreth | B03C 3/49 96/40 |
| 6,361,589 | B1 | * | 3/2002 | Loreth | B03C 3/36 55/520 |
| 6,471,746 | B2 | * | 10/2002 | Hagglund | B03C 3/12 55/521 |
| 8,523,983 | B2 | * | 9/2013 | Loreth | B03C 3/80 96/39 |
| 9,005,347 | B2 | * | 4/2015 | Lev | B03C 3/011 96/39 |
| 2012/0073436 | A1 | | 3/2012 | Li | |
| 2013/0061754 | A1 | | 3/2013 | Lev | |

FOREIGN PATENT DOCUMENTS

| | | |
|---|---|---|
| WO | WO 93/16807 A1 | 9/1993 |
| WO | WO 95/14534 | 6/1995 |
| WO | WO 97/46322 A1 | 12/1997 |
| WO | WO 03/017734 A1 | 2/2003 |
| WO | WO 2011/028162 A1 | 3/2011 |
| WO | WO 2013/105885 A1 | 7/2013 |

* cited by examiner

PRECIPITATOR UNIT

TECHNICAL FIELD OF THE INVENTION

The present invention relates to a precipitator unit of a two-stage electro filter, air to be cleaned from electrically charged particles is intended to flow through the unit, said unit comprising at least two cylindrical precipitators that each comprises at least two electrode elements arranged at a gap distance from each other, and that the precipitators also are intended to be connected to a high voltage source, the respective electrode elements of a precipitator are connected to different poles of the high voltage source.

PRIOR ART

During recent years there has been an intense focusing on indoor air of better quality, especially regarding airborne particle pollutions in combination with better, i.e. more efficient, energy use. This has created an interest about air cleaning products, e.g. filters for ventilation systems, filters for industrial application and domestic air cleaners.

The knowledge about the influence upon human beings from small respirable particles, especially from fossil fuel burning, shows that there is a giant need to catch these particles by means of ventilation filters before they reach the indoor environment. To achieve this by means of the existing mechanical filters is not possible for practical and economic reasons due to the high pressure drop and hence the high energy needs that such solutions imply. In this connection filters with high separation capacity are needed, also when dealing with particles of nano size, without a significant pressure drop in the filters. This must be effected at a relatively high air flow velocity. From environmental aspects service simplicity is desirable.

The normal air velocity in a ventilation filter is relatively seen very high and corresponds to about 2.6 m/s. The air velocity for an electro filter that fulfils the above requirements is within the same range, at least in connection with top performances.

When such an electro filter is adapted to existing so called HVAC-systems (heating, ventilation and air conditioning) that are standardized in the U.S.A. they should be accommodated within a volume of 610×610×305 mm (width× height×length) and manage a separation capacity of more than 90% at an air flow velocity of about 2.5 m/s. However, within the scope of the invention also other dimensions may be feasible regarding the available space for an electro filter.

A further requirement as regards the design of such an electro filter is that the electrode elements of the precipitator unit should be cleaned instead of exchanged. This is also valid for so called cardboard precipitators that otherwise would be of disposable type.

In WO 93/16807 and WO 95/14534 two-stage electro filters with a ionization section are described, said electro filters being followed downstream by a so called precipitator. The electrode elements of the precipitator of the mentioned applications are manufactured from non-metallic material of very high resistivity, even a resistivity corresponding to antistatic. Said electrode elements are essentially improved as regards separation capacity compared to precipitators of conventional design, i.e. of metallic material. These operational properties are based on the fact that electrode elements of material with high resistivity may be connected to higher mutual voltage, without a risk for short-circuit between adjacent electrode elements, than corresponding electrode elements designed from material of low resistivity.

According to Swedish patent application SE 0103684-7 semi-conductive current carrying wire drawings are proposed to be applied in a particular way to the respective electrode elements, said electrode elements being made out of cardboard and coated with a very thin plastic layer.

According to the applications mentioned above it is advantageous to use high resistive materials, e.g. paper when designing the precipitator compared to the traditional design with electrode elements of aluminum. The risk for short-circuit between electrode elements of high resistive materials is in principle eliminated and hence the voltage between the electrode elements may be higher compared to the traditional design of electro filters. Since the separation efficiency is very much depending on the voltage setting between the electrodes, filters with electrode elements of high resistive material, like paper filters, have an essentially improved separation capacity than corresponding traditional precipitators with electrode elements of aluminum plate. These conditions are present at least as long as the precipitator is not subjected to larger dust particles that can bridge the gap between the electrodes. The result of this bridging in combination with moisture is that the voltage between the high resistive electrode elements of the precipitator is diverted and hence the separation capacity is impaired.

In WO 97/46322 a two-stage electro filter is described, said electro filter having a ionizing section that downstreams, in the air flow direction through the device, is followed by a so called precipitator. The precipitator comprises two strip-like electrode elements that are wound several times around a central bobbin, the electrode elements having a mutual gap distance "d". Such a precipitator constitutes an almost cylindrical body. The air flow through the precipitator is in axial direction and the air flows through the open gaps that are defined between adjacent electrode elements. The precipitator described above preferably comprises especially designed paper in accordance with the description of WO 03/013734. In practice there is no limitation as regards the diameter of precipitator. On the other hand there is a limitation in practice as regards the width of the strip-like electrode, i.e. the length of the precipitator seen in the air flow direction through the precipitator.

The disadvantage of the precipitator described above is that its circular design is not suitable when the air flow duct is square or rectangular, this being the case in most ventilation units. In such a case a precipitator needs to manage an air velocity increased by 25% compared to the air velocity of the duct itself. This would on one hand significantly increase the pressure drop, since the pressure drop depends on the air velocity, and on the other hand decrease the separation capacity of the precipitator, since the separation capacity also depends on the air velocity.

When using an air velocity of about 2.5 m/s, this often being a global standard in ventilation units, and the existing standard dimensions of air flow ducts there are high demands on the thickness of the electrode elements and the gap distance between adjacent electrode elements of the precipitator in order to maintain the air flow velocity through the air flow passages of the precipitator (the gaps between adjacent electrode elements) as low as possible. Reasonably, the thickness of the electrode elements should be less than 0.7 mm and the gap distance "d" less than 3 mm. Preferably, the gap distance should be less than 2 mm and the thickness of the electrodes should be less than 0.5 mm. Of course, also other dimensions of the gap distance and thickness could be valid within the scope of the invention.

OBJECTS AND FEATURES OF THE INVENTION

A primary object of the present invention is to present a way to design a precipitator unit with cylindrical precipitators, preferably with electrode elements of paper, adapted to clean air in air flowing ducts, preferably in ventilation appliances and also in so called HVAC systems.

At least the primary object of the present invention is realized by a device that has been given the features of the adherent independent claim 1. Preferred embodiments of the invention are defined in the dependent claims.

BRIEF DESCRIPTION OF THE DRAWINGS

Below a preferred embodiment of the invention will be described, reference being made to the accompanying drawings, where.

DETAILED DESCRIPTION OF PREFERRED EMBODIMENTS OF THE PRESENT INVENTION

Figure 1:
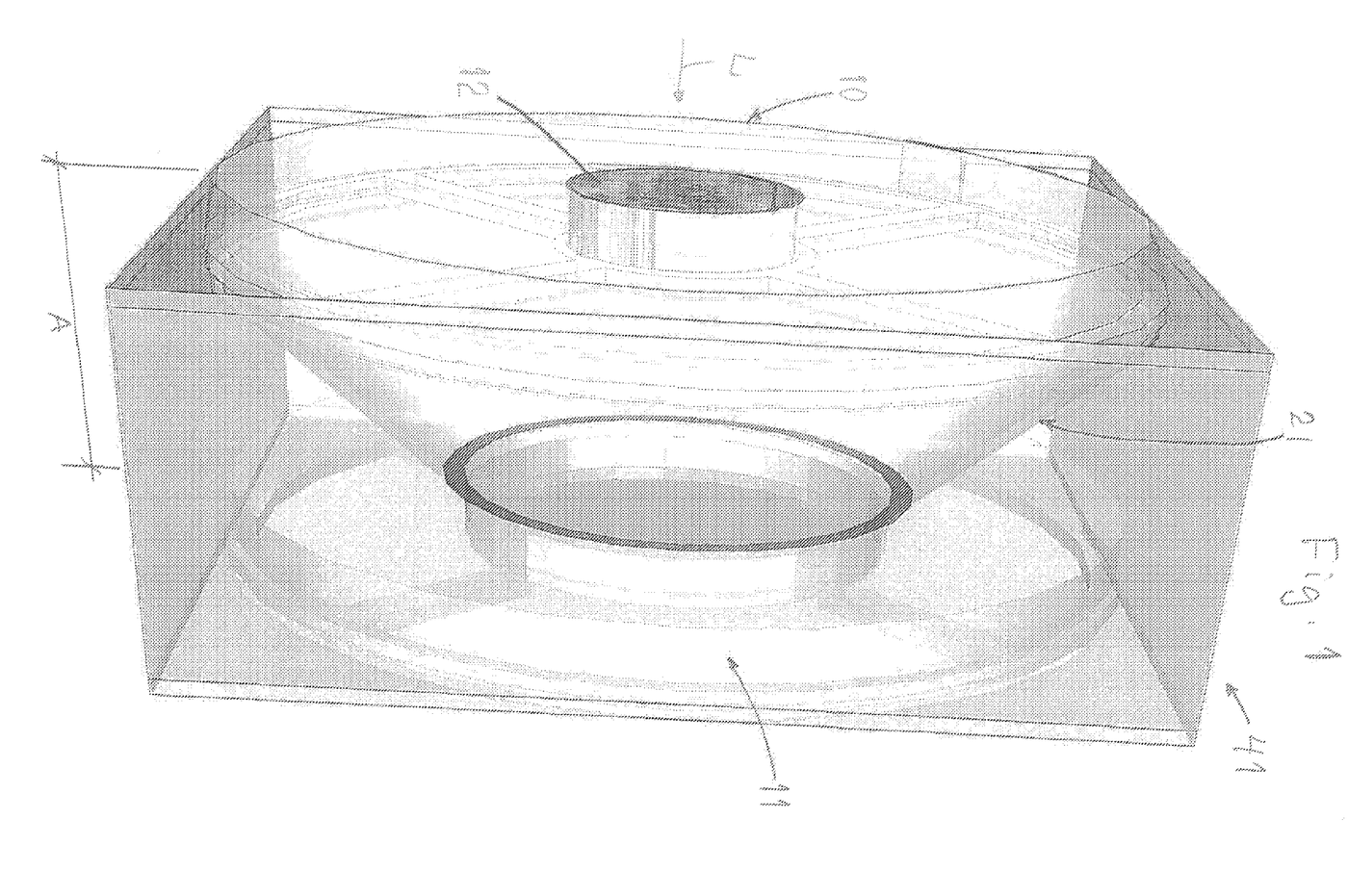
FIG. 1 shows a perspective view of a device according to the present invention, the casing of the device is transparent for clarifying purposes.

As shown in cut away section in FIG. 1 a device according to the present invention includes a cartridge that comprises a casing 41 having square cross-section, the cartridge suitably being intended to be mounted in an air flow duct. The device also comprises a first cylindrical precipitator 10 and a second cylindrical precipitator 11 that are located in the casing 41 with square cross-section. The axial distance between the precipitators is marked with A in FIG. 1. Generally, the main planes of the precipitators 10, 11 are parallel to each other. The arrow L indicates the air flow direction through the cartridge.

Figures 2, 3:
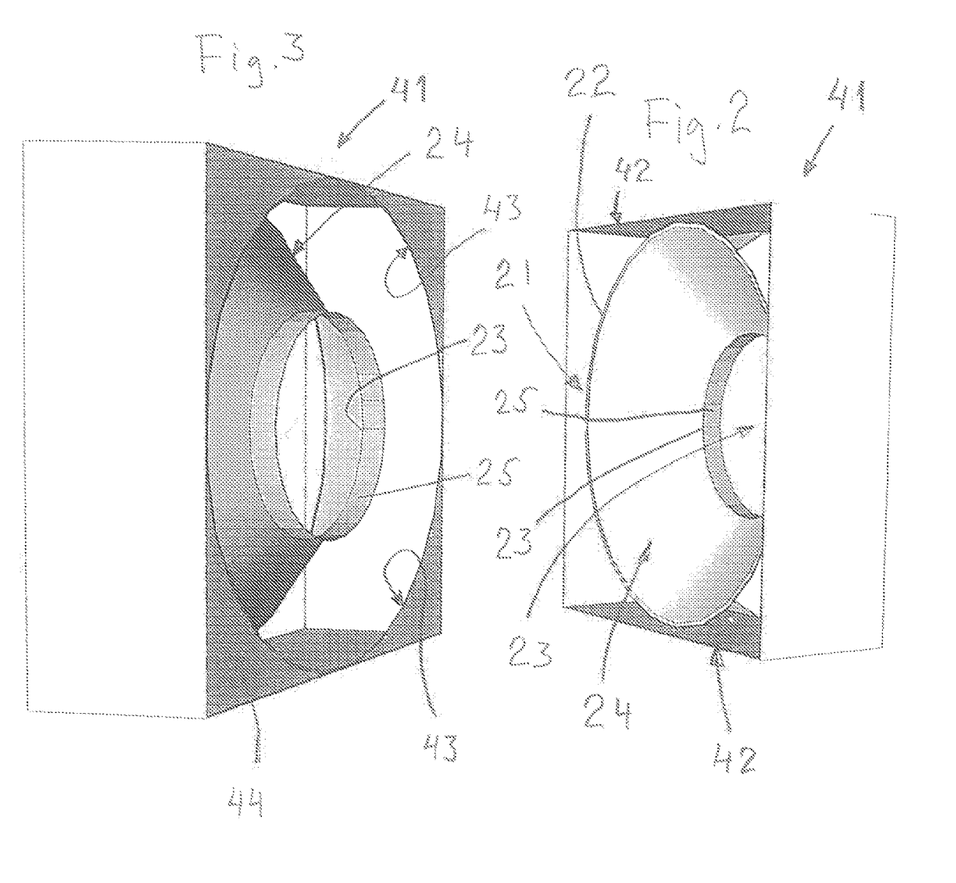
FIGS. 2-3 show perspective views of a cone shaped duct that is part of the device according to the present invention.

As is evident from FIG. 1 a cone shaped duct 21 extends between the precipitators 10, 11, the cone shaped duct 21 and the casing 41 are shown separately in FIGS. 2 and 3. As is evident from FIGS. 2 and 3 the cone shaped duct 21 is defined by a circular inlet opening 22, see FIG. 2, and a circular outlet opening 23, see FIG. 3, and an envelope surface 24 that extends between the openings. In the shown embodiment the circular inlet opening 22 contacts the inner side surfaces of the casing 41. The outlet opening is defined by a collar 25.

As also is evident from FIGS. 2 and 3 the casing 41 defines a square opening 42 at its inlet end, where the first precipitator 10 is intended to be mounted, and a circular opening 43 at its outlet end, where the second precipitator 11 is intended to be mounted. The circular outlet opening 43 is received in a wall 44 of the casing 41, said wall 43 being transverse to the air flow direction. In the shown embodiment the circular opening 43 touches the inner side surfaces of the casing 41. The square opening 42 represents the cross-section area available to the air that enters the casing 41 and the circular opening 43 is the cross-section area available to the air that leaves the casing 41.

Figure 4:
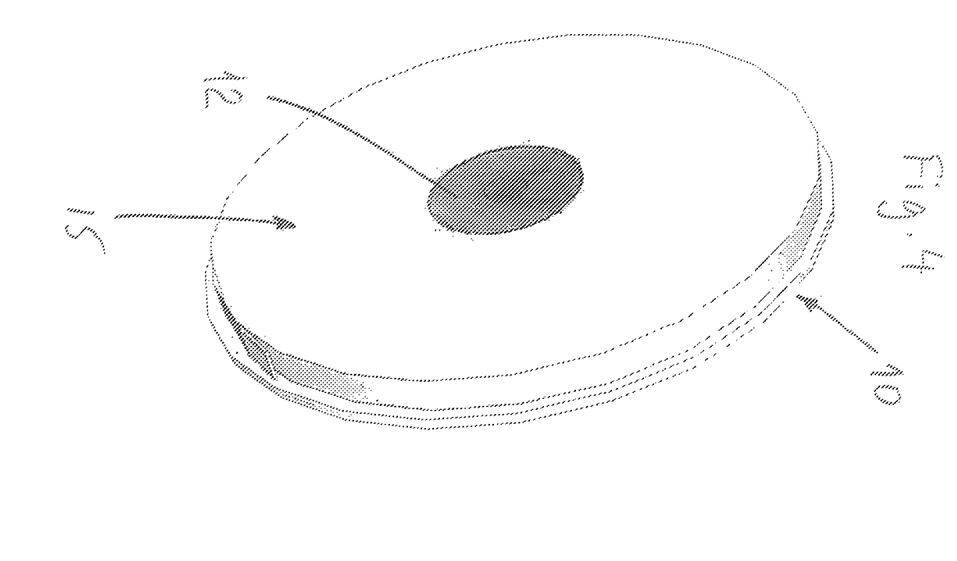
FIGS. 4-5 show perspective views of a first precipitator that is part of the device according to the present invention.
Figure 5:
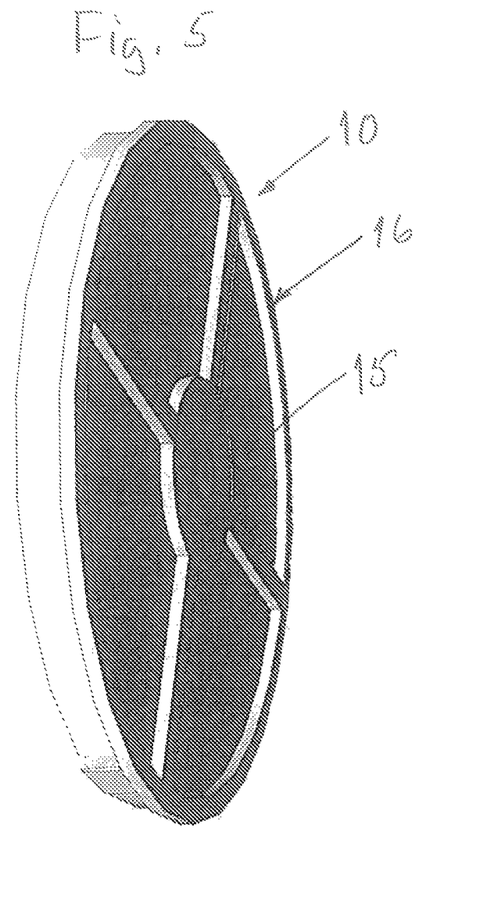

In FIGS. 4 and 5 the first precipitator 10 is shown separately, said first precipitator 10 has a center part 12 and two strip-like electrode elements emanating from said center part 12, said electrode elements being wound several times around the center part 12 with a mutual gap distance "d" between the electrode elements. If the electrode elements are made from cardboard and coated with a thin plastic layer they are preferably provided with a moisture barrier on their edges, reference being made to WO 2013/105885, said document describing a method to apply a moisture barrier on the electrode elements and a moisture protected semi-finished product to be used for manufacture of precipitators.

In FIGS. 4 and 5 the individual electrode elements are not shown but the body generated by the electrode elements is designated 15 in FIGS. 4 and 5. As is evident from FIG. 5 the first precipitator 10 also comprises a first skeleton 16 equipped with spokes. Such a precipitator 10 defines generally a cylindrical body. The air flow through the precipitator 10 is in axial direction and trough open gaps that are created between adjacent electrode elements. Both of the electrode elements are preferable manufactured from a very high ohmic material having a resistivity corresponding to or higher than antistatic. There is no air flow through the center part 12.

When the first precipitator 10 is mounted in the casing 41 in such a way that is disclosed in FIG. 1 air flow openings will be defined in the four corners of the casing 41. A prerequisite for this is that the circumference of the first precipitator 10 contacts the inner side surfaces of the casing 41. The first precipitator 10 is in a conventional way connected to a high voltage source (not shown) and the respective electrode elements are connected to different poles of the high voltage source.

The first precipitator 10 fits close to the circular inlet opening 22 of the cone shaped duct 21 and hence the air that passes through first precipitator 10 flows through the inlet opening 22 of the cone shaped duct 21 and passes through the outlet opening 23 of the cone shaped duct 21.

Figure 6:
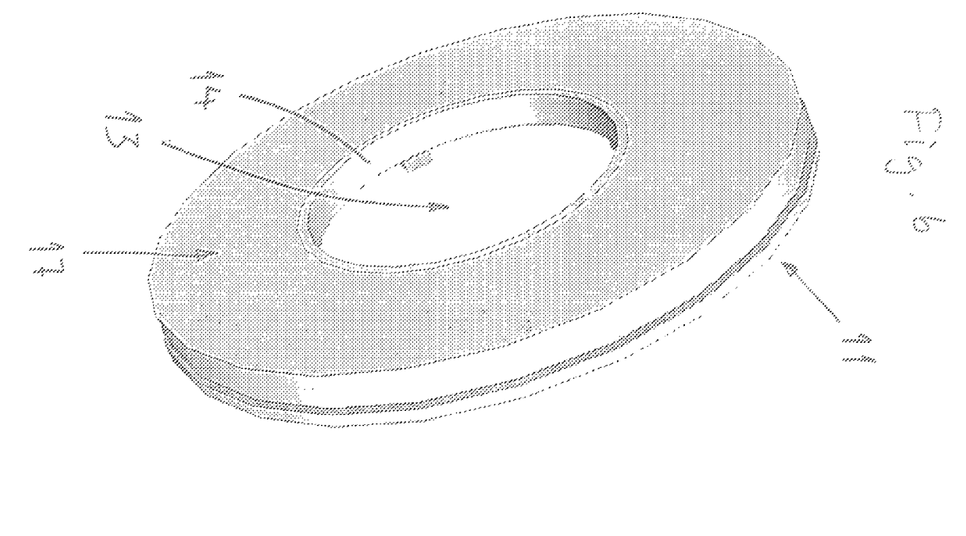
FIGS. 6-7 show perspective views of a second precipitator that is part of the device according to the present invention.
Figure 7:
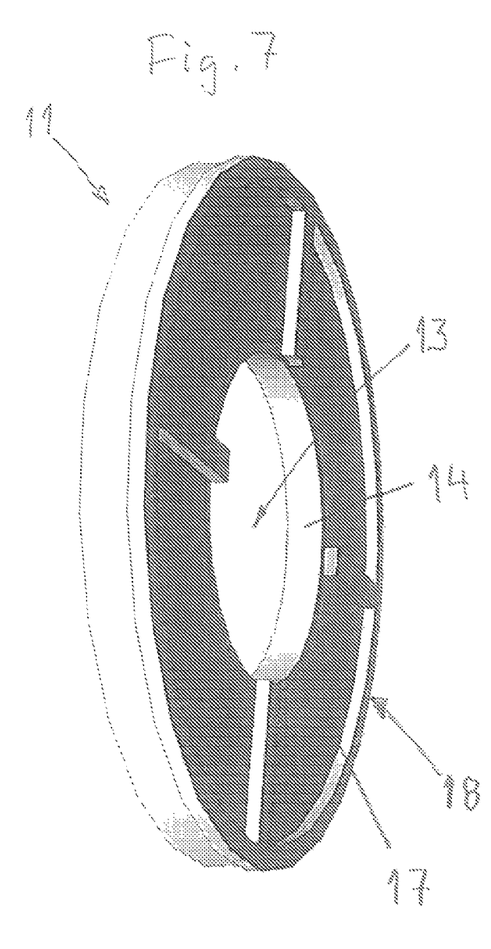

In FIGS. 6 and 7 the second precipitator 11 is shown separately, said second precipitator 11 having a center opening 13 that is defined by an annular element 14. The second precipitator 11 has two strip-like electrode elements that emanate from the annular element 14. The electrode elements are wound several times around the annular element 14 with a gap distance "d" between the respective electrode elements. If the electrode elements are made from cardboard and coated with a thin plastic layer they are preferably provided with a moisture barrier on their edges, reference being made to WO 2013/105885, said document describing a method to apply a moisture barrier on the electrode elements and a moisture protected semi-finished product to be used for manufacture of precipitators.

In FIGS. 6 and 7 the individual electrode elements are not shown but the body generated by the electrode elements is designated 17 in FIGS. 6 and 7. As is evident from FIG. 7 the second precipitator 11 also comprises a second skeleton 18 equipped with spokes. Such a precipitator 11 defines generally a cylindrical body. The air flow through the second precipitator 11 is in axial direction and trough open gaps that are created between adjacent electrode elements. Both of the electrode elements are preferable manufactured from a very high ohmic material having a resistivity corresponding to or higher than antistatic.

When the second precipitator 11 is mounted in the casing 41 in such a way that is disclosed in FIG. 1 the circumference of the second precipitator 11 will be receive in the circular opening 43 and the annular element 14 of the center opening 13 is threaded on the collar 25 that defines the outlet opening 23. The diameters of the center opening 13 and the outlet opening 23 are mutually adapted in such a way that the annular element 14 fits closely to the collar 25. The second precipitator 11 is in a conventional way connected to a high voltage source (not shown) and the respective electrode elements are connected to different poles of the high voltage source.

Figure 8:
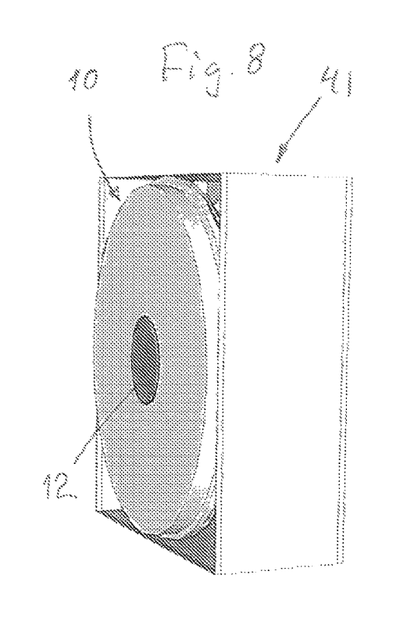
FIGS. 8-9 show perspective views of the device of FIG. 1 according to the present invention.
Figure 9:
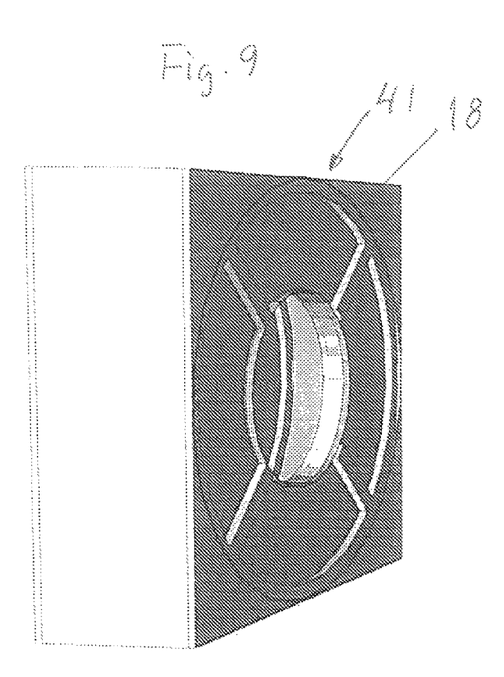

In FIGS. 8 and 9 two perspective views of the device according to the present invention are shown, i.e. when the precipitators 10 and 11 are mounted in the casing 41 in the way that is described above.

The device according to the present invention, as described above, functions in the following way. In this connection it should be pointed out that air is supplied to the device according to the present invention, as shown in FIG. 1, in the direction of the arrow L. The air holds charged particles since the air has passed through an ionization chamber where the particles have been charged in a previously known way. This is not shown in FIG. 1. A prerequisite is also that air flow through the device is arranged for.

When the air enters the casing 41 in the direction of the arrow L a portion of the air will pass through the first precipitator 10 while the rest of the air will pass through the air flow openings in the four corners of the casing 41. The air passing through the first precipitator 10 will be subjected to an efficient purification since the charged particles are separated. The purified air flows then through the cone shaped duct 21 and leaves via the outlet opening 23. Since the duct 21 narrows in direction towards the outlet opening 23 the air passing the first precipitator 10 will be subjected to a certain increase in air velocity. However, this increase in air velocity takes place subsequent to the purifying of the air.

The air that flows through the openings in the corners of the casing 41 will flow through the second precipitator 11 and hence subjected to an efficient purification.

A preferred dimensioning in accordance with the present invention is that the outer diameter of the second precipitator 11 corresponds to the inner dimensions of the air duct 41 and the center opening 13 of the second precipitator 11 corresponds to about 25% of the cross-section area of the casing 41, i.e. the square area in which the circular opening 43 is located. For a duct having a width of 610 mm and a height of 610 mm, this being standard dimensions as regards the U.S. HVAC-system, the center opening 13 would have a diameter of about 350 mm. As regards the first precipitator 10 its outer diameter could preferably be somewhat smaller than the width and height of the air flow duct that is defined by the casing 41.

Suitable dimensions of the length of the precipitators 10, 11, the length being in the air flow direction, is about 100 mm. The length of the cone shaped duct 21, the length being in the air flow direction, could also be about 100 mm. Thereby, the device according to the present invention will be adapted to the existing U.S. HVAC-system where the available length in the air flow direction is somewhat more than 300 mm. Of course also other dimensions are possible within the scope of the invention.

At an air velocity of 2.5 m/s, this generally being standard in ventilation systems and hence also for the HVAC-system, and the existing standard dimensions regarding air flow ducts there are high demands regarding the thickness of the electrode elements and the gap distance between adjacent electrode elements in order to keep the air flow velocity through the air flow passages/the gaps of the precipitator as low as possible. Reasonably, the thickness of the electrode elements should be less than 0.7 mm and the gap distance "d" between adjacent electrode elements should be less than 3 mm. Preferably, the gap distance should be less than 2 mm and the thickness of the electrode elements less than 0.5 mm.

Of course it is feasible to use other dimensions as regards the precipitators 10, 11 as well as the cone shaped duct 21. However, it is important that the air flow through the casing 41 is effected in such a way that a portion of the air passes through the first precipitator 10 and that the rest of the air passes through the second precipitator 11.

By the proposed design of the device according to the present invention the total flow area of the two precipitators 10, 11 may in practice increase by about 25-30% compared to the cross-section area of the casing 41 at its inlet end. If only a cylindrical precipitator is to be used in a square air flow duct the available air flow area would instead decrease by 25% and a corresponding increase of the air velocity through the precipitator.

It is possible to use other dimensions as regards the precipitators 10, 11. It could also be advantageous that one precipitator 10 or 11 is replaced by two or more subsequent precipitators. Each group of precipitators has the same outer diameter. However, the electrode elements of the precipitators within the same group could have different dimensions and their gap dimensions could be different. The precipitators 10, 11 within the same group could have individual voltage supply from separate high voltage sources or connected to a common high voltage source. Preferably, the voltage supply is effected via high ohmic resistance.

Figure 10:
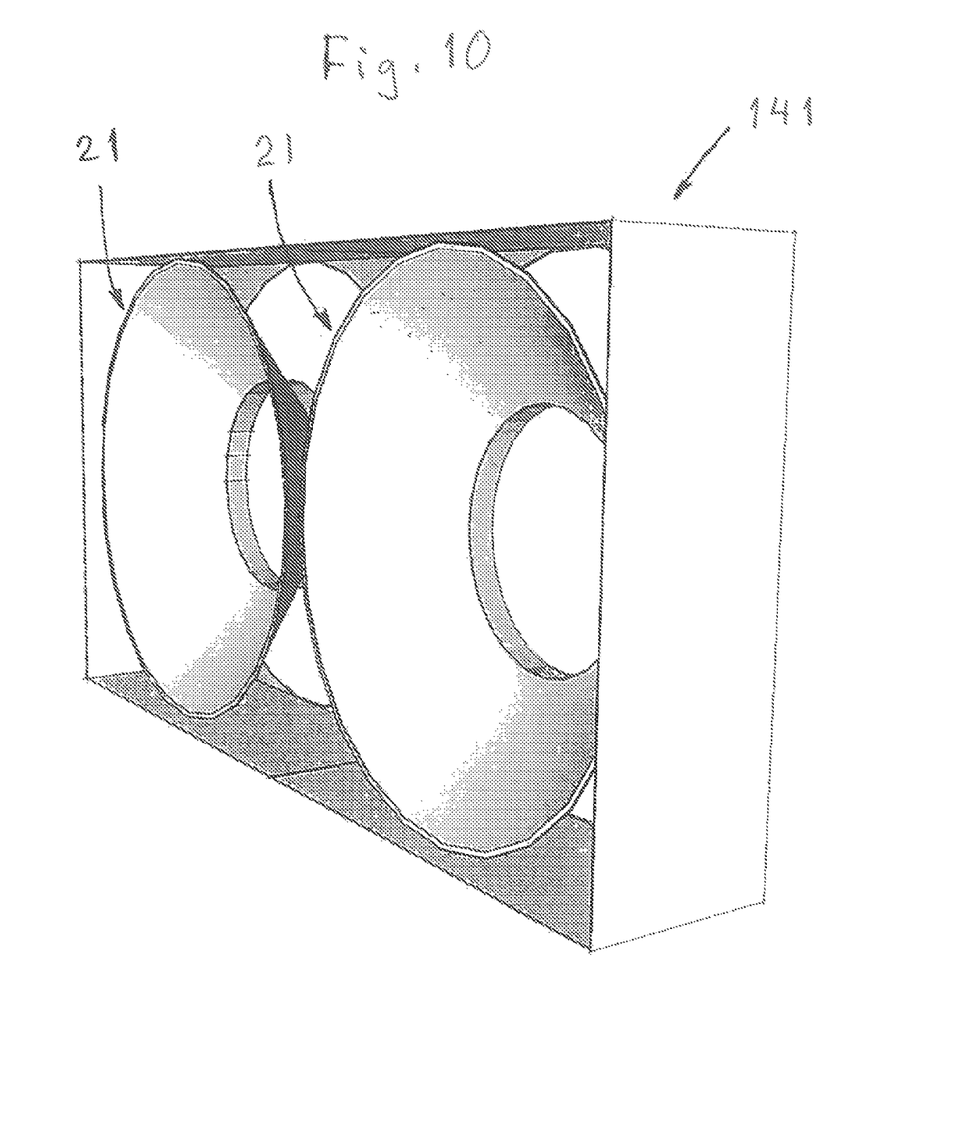
FIG. 10 shows an alternative embodiment of parts of the device according to the invention.

As is shown in FIG. 10 it is also possible to arrange two or more cartridges laterally next to each other if demanded by the cross-sectional dimension of the air flow duct. If several cartridges are arranged laterally next to each other the walls between the cartridges may be omitted, see FIG. 10 that shows an alternative design where two cone shaped ducts 21 are provided inside a casing 141. In this connection it should be noted that there is no partition between the cone shaped ducts 21 but the casing 141 has only external walls. In order to achieve a cartridge according to the present invention the casing according to FIG. 10 must be completed with first and second precipitators 10, 11. It is of course also generally feasible that an arbitrary number of precipitator units are assembled in a corresponding was as shown in FIG. 10.

Figure 11:
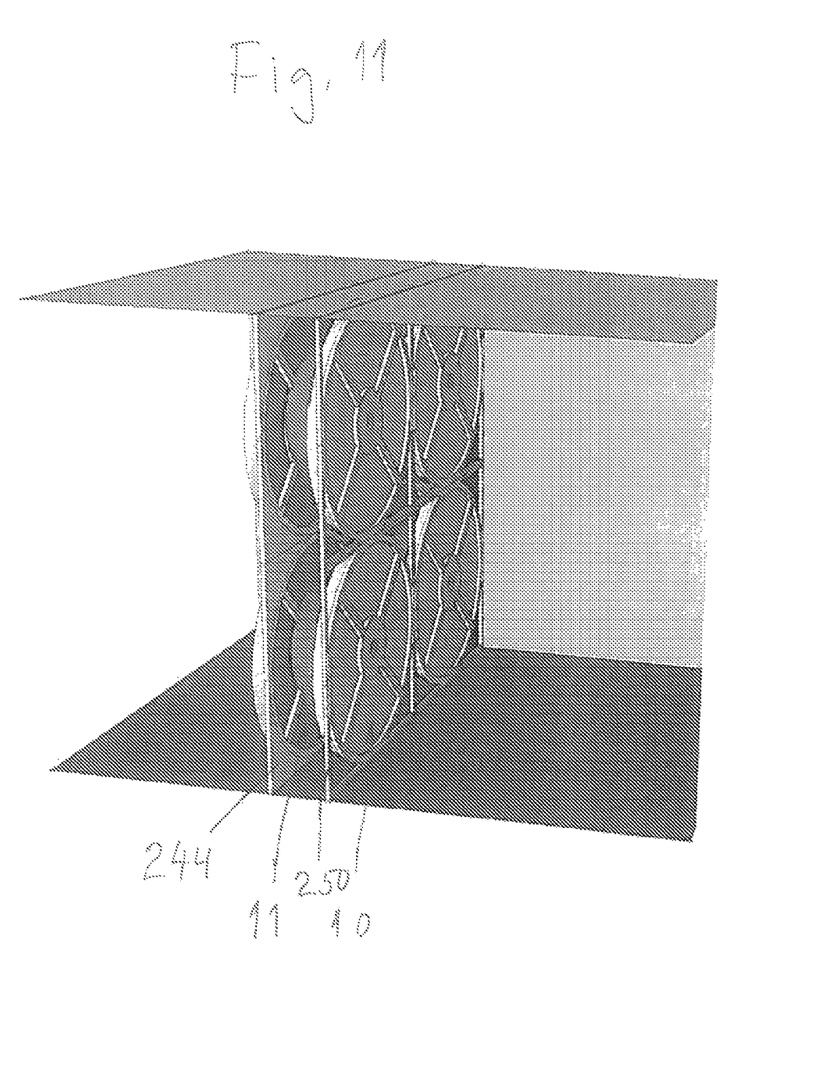
FIG. 11 shows an embodiment where a number of precipitator components are mounted in a ventilation duct.

In FIG. 11 it is illustrated how the cross-section of a number of assembled precipitator units corresponds to the cross-section of an existing ventilation duct. In such a case the casing 41 may in principle be omitted. The first precipitators 10 are mounted in frames 250 while the second precipitators 11 are mounted in walls 244 extending transverse to the air flow direction.

Of course, nothing prevents that the device according to the present invention is used for cleaning air in recirculating air cleaning devices for household, office and other indoor environments.

Feasible Modifications of the Invention

In the embodiment described above in FIG. 1 air is supplied in the direction of the arrow L. However, nothing prevents that the air flow through the precipitator unit is in the opposite direction. In such a case the charging of particles must of course be effected upstream of the precipitator unit, i.e. on the opposite side of the precipitator compared to the embodiment described above. When the air passes in the opposite direction, i.e. opposite to the air direction L, the air will initially flow through the outlet opening 23 and through the second precipitator 11. The air that enters via the outlet opening will then flow through the cone shaped duct 21 and through the first precipitator 10. The air entering via the second precipitator 11 will leave through the openings that are located in the four corners of the casing 41, i.e. between the inner side of the casing 41 and the circumference of the first precipitator 10.

In the embodiment described above the air flow duct is square. Within the scope of the present invention the air flow duct may have any cross-sectional shape. Due to the air flow velocity through the precipitators it is advantageous if as large portion as possible of the cross-section of the air flow duct is occupied with precipitator units according to the present invention. However, in this connection it should be pointed out that there must be means that brings about that the air that passes outside the circumference of the first precipitator 10 is forced to pass through the second precipitator 11. These means may for instance constitute a surface of some kind that extends transverse to the air flow direction, said surface being equipped with an opening 43 that the second precipitator is mounted in. For instance it is possible to have a surface that corresponds to the rear wall in the casing 41 or the skeleton 18 of the second precipitator 11, said skeleton 18 being given a shape that corresponds to the cross-section of the air flow duct. As shown, the skeleton 18 is equipped with suitable spokes and a suitable opening corresponding to the opening for air flowing through the cone shaped duct 21.

It is not necessary that the device according to the present invention is in the shape of a cartridge. Thus, it is feasible that the precipitators 10, 11 and the cone shaped ducts 21 are directly mounted in a suitable way in an air flow duct in a corresponding way as they are mounted in the casing of the cartridge. However, in this connection it should be pointed out that the means described in the passage above, said means bringing about that the air that passes outside the circumference of the first precipitator 10 is forced to pass through the second precipitator 11 are necessary also in this case. The cone shaped duct 21 may be welded directly to the inner side surfaces of the air flow duct. The central outlet opening 23 of the cone shaped duct 21 is oriented just opposite the center opening 13 of the second precipitator 11. The first precipitator 10 is mounted in a suitable way to be received in the inlet opening 22 of the cone shaped duct 21. In such a case the device according to the present invention will in principle include one or more first precipitators 10, a corresponding number of cone shaped ducts 21 that are assembled mechanically in a suitable way and a corresponding number of second precipitators 11.

In the above described preferred embodiment of the device according to the present invention the circular inlet opening 22 contacts the inner side surfaces of the casing 41. Within the scope of the present invention it is however feasible that the inlet opening 22 has a smaller diameter and hence the first precipitator 10 normally is given a correspondingly smaller diameter. In such a case a continuous air flow opening will be defined between the circumference of first precipitator 10 and the inner side surfaces of the casing 41. A decrease of the diameter of the inlet opening 22 will of course affect the conicity of the cone shaped duct 21. The second precipitator 11 is preferably given a maximum diameter by making the circular outlet opening 43, in which the second precipitator 11 is received, to contact the inner side walls of the casing 41.

The electrode elements of the precipitators 10, 11 are preferably manufactured from a very high ohmic material with a resistivity corresponding to or higher than antistatic. Within the scope of the present invention it is feasible that the electrode elements are manufactured from a material with low resistivity, e.g. aluminum.

In the embodiment described above the outlet opening of the cone shaped duct 21 is equipped with a collar 25. Within the scope of the present invention it is feasible that the collar 25 is omitted and that the outlet opening 23 is located just opposite the center opening 13 of the second precipitator 11.

In the embodiment described above the precipitators 10, 11 are equipped with a skeleton that comprises spokes. Within the scope of the present invention it is feasible that the precipitators have no skeleton but are assembled in an alternative way, e.g. by means of radial glue strings on at least one side of the precipitator or by means of radial comb shaped rulers.

The invention claimed is:

1. Precipitator unit of a two-stage electro filter, an air flow to be cleaned of electrically charged particles is intended to flow through the unit, said unit comprising at least two cylindrical precipitators that each comprises at least two electrode elements arranged at a gap distance from each other, and that each one of the precipitators is connected to a high voltage source, the respective electrode elements of each precipitator are connected to different poles of the high voltage source, wherein the precipitators define first and second air flow areas, said areas being arranged axially spaced in the air flow direction, that third air flow areas are provided outside the circumference of the first precipitator, the second precipitator is equipped with a center opening that defines a fourth air flow area, and a cone shaped duct extends between the circumference of the first precipitator and the center opening of the second precipitator.

2. Precipitator unit according to claim 1,
wherein the electrode elements of the precipitators preferably are designed from an ohmic material with a resistivity corresponding to antistatic or higher.

3. Precipitator unit according to claim 1,
further comprising a casing in which the first and second precipitator and the cone shaped duct are received.

4. Precipitator unit according to claim 3,
wherein the casing defines a rectangular inlet opening and a circular outlet opening for the air to be cleaned.

5. Precipitator unit according to claim 1,
wherein an existing ventilation duct constitutes a casing for a plurality of said precipitator units.

6. Precipitator unit according to claim 1,
wherein the first precipitator has a smaller external diameter than the second precipitator.

7. Precipitator unit according to claim 1,
comprising several first precipitators arranged axially spaced in the air flow direction.

8. Precipitator unit according to claim 1,
comprising several second precipitators arranged axially spaced in the air flow direction.

9. Precipitator unit according to claim 1,
comprising a number of first precipitators arranged laterally next to each other, a corresponding number of cone shaped ducts that are arranged laterally next to each other, a corresponding number of second precipitators that are arranged laterally next to each other, and a casing that is common for said components, said casing having only external walls.

10. Precipitator unit according to claim 2, wherein the electrode elements of the precipitators are manufactured from cardboard with a thin plastic coating, and that at least one longitudinal edge of each electrode element has a moisture barrier.

* * * * *